United States Patent
Mackay et al.

(10) Patent No.: US 10,808,692 B2
(45) Date of Patent: Oct. 20, 2020

(54) SYSTEMS AND METHODS FOR FLUID END MONITORING

(71) Applicant: Gardner Denver Petroleum Pumps, LLC, Tulsa, OK (US)

(72) Inventors: Evan Gregory Mackay, Tulsa, OK (US); Gregory David Hash, Broken Arrow, OK (US)

(73) Assignee: GARDNER DENVER DEUTSCHLAND GMBH, Bad Neustadt (DE)

( * ) Notice: Subject to any disclaimer, the term of this patent is extended or adjusted under 35 U.S.C. 154(b) by 335 days.

(21) Appl. No.: 15/833,210

(22) Filed: Dec. 6, 2017

(65) Prior Publication Data
US 2019/0169944 A1    Jun. 6, 2019

(51) Int. Cl.
*F04B 49/06*    (2006.01)
*F04B 51/00*    (2006.01)
(Continued)

(52) U.S. Cl.
CPC ............ *F04B 49/065* (2013.01); *E21B 21/08* (2013.01); *E21B 47/06* (2013.01); *F04B 47/02* (2013.01);
(Continued)

(58) Field of Classification Search
CPC ........ F04B 49/065; F04B 51/00; F04B 47/02; F04B 2201/0201; F04B 49/06;
(Continued)

(56) References Cited

U.S. PATENT DOCUMENTS 3,013,830 A    12/1961    Milligan
3,419,280 A    12/1968    Wheeler
(Continued)

FOREIGN PATENT DOCUMENTS

CA    2928704 A1    11/2016
CN    1718995 A    1/2006
(Continued)

OTHER PUBLICATIONS

Abrams, P. I. et al, "A Users Approach to Qualification of Dynamic Seals for Sour-Gas Environments", SPE Production ENgineering, Aug. 1990, 2 pages, vol. 5, Issue 3, Society of Petroleum Engineers.
(Continued)

*Primary Examiner* — Peter J Bertheaud
(74) *Attorney, Agent, or Firm* — Michael Best & Friedrich LLP

(57) ABSTRACT

A system for monitoring a fluid end of a high pressure pump. The system is configured to receive, with a fluid end data logger attached to the fluid end, fluid end data from a plurality of sensors associated with the fluid end, and a fluid end identifier associated with the fluid end; tag, with an electronic processor in the fluid end data logger, the fluid end data with the fluid end identifier; store, with a memory coupled to the electronic processor, the tagged fluid end data; send, with a transceiver in the fluid end data logger, the tagged fluid end data to a power end; and receive, with the transceiver in the fluid end data logger, a power end data from the power end, the power end data including a power end identifier.

20 Claims, 3 Drawing Sheets

(51) Int. Cl.
   *F04B 47/02* (2006.01)
   *E21B 21/08* (2006.01)
   *E21B 47/06* (2012.01)
   *G01V 11/00* (2006.01)
   *E21B 47/009* (2012.01)
   *E21B 43/12* (2006.01)

(52) U.S. Cl.
   CPC .............. *F04B 49/06* (2013.01); *F04B 51/00* (2013.01); *E21B 43/121* (2013.01); *E21B 43/127* (2013.01); *E21B 47/009* (2020.05); *F04B 2205/05* (2013.01); *G01V 11/002* (2013.01)

(58) Field of Classification Search
   CPC ...... F04B 2205/05; F04B 47/00; F04B 49/10; F04B 2205/03; F04B 49/20; F04B 2203/0209; F04B 2205/04; E21B 47/00; E21B 43/127; E21B 43/121; E21B 47/008; E21B 47/12; E21B 47/13; E21B 41/0092; E21B 47/06; E21B 21/08
   See application file for complete search history.

(56) References Cited

U.S. PATENT DOCUMENTS

| | | | |
|---|---|---|---|
| 4,440,404 A | 4/1984 | Roach et al. | |
| 4,811,959 A | 3/1989 | Bullard et al. | |
| 5,137,083 A | 8/1992 | Bump | |
| 5,478,048 A | 12/1995 | Salesky et al. | |
| 5,772,403 A | 6/1998 | Allison et al. | |
| 6,257,850 B1 | 7/2001 | Conn | |
| 7,277,778 B2* | 10/2007 | Burns, Sr. | G05D 7/0676 422/106 |
| 7,284,602 B2 | 10/2007 | Tessier et al. | |
| 7,542,875 B2* | 6/2009 | Rogers | F04B 51/00 417/63 |
| 7,581,449 B2 | 9/2009 | Miller | |
| 7,623,986 B2 | 11/2009 | Miller | |
| 7,656,305 B2 | 2/2010 | Kennedy | |
| 8,347,957 B2 | 1/2013 | Stephenson et al. | |
| 8,579,599 B2 | 11/2013 | Leugemors et al. | |
| 8,874,383 B2 | 10/2014 | Gambier et al. | |
| 9,080,438 B1* | 7/2015 | McCoy | E21B 47/009 |
| 9,324,049 B2 | 4/2016 | Thomeer et al. | |
| 9,797,395 B2* | 10/2017 | Urdaneta | F04B 9/045 |
| 10,371,142 B2* | 8/2019 | Mills | E21B 43/121 |
| 10,612,538 B2* | 4/2020 | Baker | F04B 49/02 |
| 2006/0078435 A1* | 4/2006 | Burza | F04B 49/065 417/279 |
| 2010/0008804 A1 | 1/2010 | Liska | |
| 2010/0300683 A1 | 12/2010 | Looper et al. | |
| 2012/0020808 A1* | 1/2012 | Lawson | F04B 51/00 417/18 |
| 2014/0095554 A1 | 4/2014 | Thomeer et al. | |
| 2015/0132152 A1 | 5/2015 | Lazzara | |
| 2015/0377318 A1 | 12/2015 | Byrne | |
| 2016/0208794 A1 | 7/2016 | Singh et al. | |
| 2016/0356270 A1 | 12/2016 | Zhang et al. | |
| 2017/0363079 A1* | 12/2017 | Baker | E21B 47/009 |

FOREIGN PATENT DOCUMENTS

| | | |
|---|---|---|
| CN | 202673654 U | 1/2013 |
| CN | 204283407 U | 4/2015 |
| CN | 204511849 U | 7/2015 |

OTHER PUBLICATIONS

PTFE Seal Design Guide, 192 pages, Parker Hannifin Corp., Packing Division Europe.

Plunger Packing, Plunger Packing Guide, 14 pages, UTEX Industries, Inc., Houston, TX.

* cited by examiner

SYSTEMS AND METHODS FOR FLUID END MONITORING

FIELD OF THE INVENTION

The present invention relates generally to systems and methods for monitoring a fluid end of a pump. More particularly, this invention relates to storing of monitored sensor data associated with the fluid pump.

BACKGROUND

High-pressure fluid pumps have been used for many years in areas including drilling processes. These pumps include a power end and a fluid end that can be monitored for various operational characteristics. Typically, data associated with life conditions experienced by several components of the high-pressure fluid pump are retrieved and organized by a particular site location. However, when one of the components (for example, the fluid end) is moved from one site to another it becomes difficult to replicate the history of the life conditions associated with the component that has been moved.

SUMMARY

In one embodiment, a fluid end monitoring system is provided. The fluid end monitoring system comprises a fluid end and a fluid end data logger coupled to the fluid end. The fluid end data logger includes a memory to store fluid end sensor data received from a plurality of sensors associated with the fluid end, and a fluid end identifier associated with the fluid end. The fluid end data logger also includes an electronic processor configured to tag the fluid end sensor data with the fluid end identifier and generate a tagged fluid end sensor data, and a transceiver configured to send the tagged fluid end sensor data to a power end, and receive a power end data from the power end, the power end data including a power end identifier.

In another embodiment, a high pressure pump is provided. The high pressure pump includes a power end, a fluid end operably coupled to the power end, a power end data logger coupled to the power end, and a fluid end data logger coupled to the fluid end. The fluid end data logger includes a memory to store a first sensor data received from a first plurality of sensors associated with the fluid end and a fluid end identifier associated with the fluid end, an electronic processor configured to tag the first sensor data with the fluid end identifier, and a transceiver configured to send the tagged sensor data to a power end data logger, and receive a power end data from the power end data logger, the power end data including a power end identifier.

In yet another embodiment, a method for monitoring a fluid end of a high pressure pump is provided. The method includes receiving, with a fluid end data logger attached to the fluid end, fluid end data from a plurality of sensors associated with the fluid end, and a fluid end identifier associated with the fluid end; tagging, with an electronic processor in the fluid end data logger, the fluid end data with the fluid end identifier; storing, with a memory coupled to the electronic processor, the tagged fluid end data; sending, with a transceiver in the fluid end data logger, the tagged fluid end data to a power end; and receiving, with the transceiver in the fluid end data logger, a power end data from the power end, the power end data including a power end identifier.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
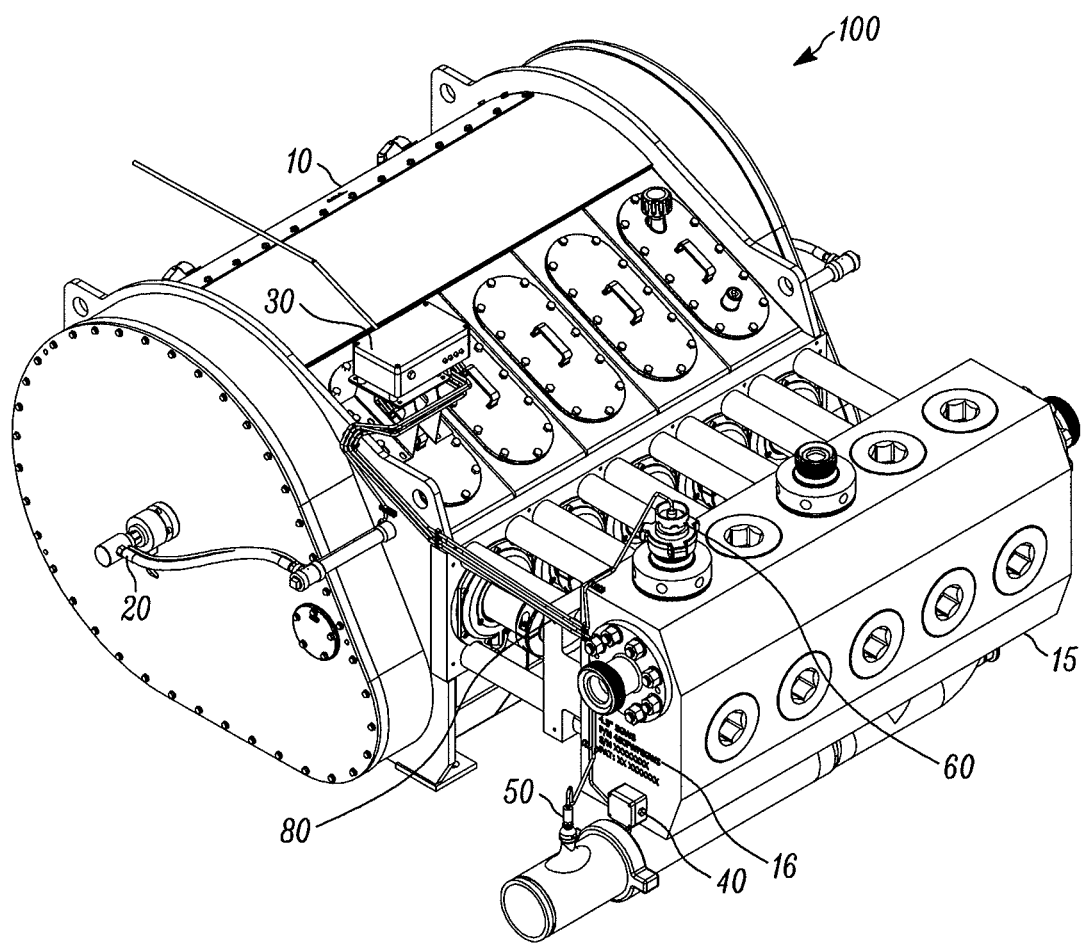
FIG. 1 is a perspective view of a high pressure pump, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Systems and methods provided herein allow for maintaining a permanent local record of life conditions experienced by a specific component of interest such as a fluid end of a high pressure pump. Frequently, the fluid end data is collected and stored on operator or remote servers that might reside in the cloud but are never attached to the device. Furthermore, this data is generally organized by site and not by a particular component such as the fluid end. This makes it difficult and time-consuming to reconstruct a specific component's lifetime operating condition. Permanent local data storage of time-stamped, synchronized data from all available sensors associated with a component provides for a better way to determine the cause of component failures, the component life conditions, and enables improving product design and construction over time. Using the systems and methods described below, a complete operating profile of a fluid end can be established at any point during the life of the fluid end.

FIG. 1 is a perspective view of a high pressure pump 100, in accordance with some embodiments. High pressure pump 100 includes a power end 10 coupled to a fluid end 15. The design of the power end 10 and the fluid end 15 is well known and will not be described herein in detail. The power end 10 is coupled to an RPM sensor 20 and a power end logger 30. The RPM (revolutions-per-minute) sensor 20 is capable of measuring the speed of the engine or electric motor. The power end logger 30 is configured to store sensor data (for example, the RPM sensor 20) associated with the power end. The fluid end 15 is coupled to a suction pressure sensor 50, a discharge pressure sensor 60, and a fluid end logger 40. The power end 10 is communicatively coupled to the fluid end 15 via a bus 80 that couples the power end logger 30 and the fluid end logger 40. The fluid end 15 also includes a fluid end identifier 16. In some embodiments, the fluid end identifier 16 includes a radio frequency identifier (RFID) component capable of transmitting a signal including identification information associated with the fluid end 15. In some embodiments, the fluid end logger 40 is directly attached to the fluid end 15 using either bolts or a strong magnet. In some embodiments, the fluid end logger 40 is contained within a weather resistant enclosure and the electrical and data communication connections to the fluid end logger 40 meets or exceeds National Electrical Manufacturers Association (NEMA) water proof rating (for example, IP67).

Figure 2:
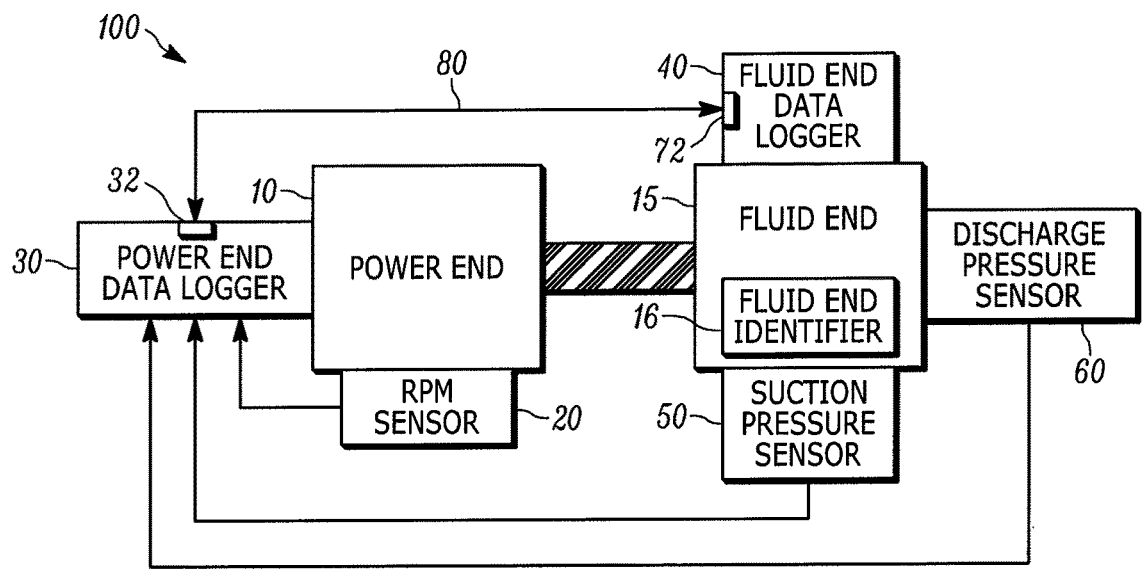
FIG. 2 is a block diagram of the high pressure pump shown in FIG. 1, in accordance with some embodiments.

FIG. 2 is a block diagram of the high pressure pump 100 shown in FIG. 1, in accordance with some embodiments. In operation, the fluid end 15 is coupled to the power end 10 and the power end 10 is driven by a prime mover such as an engine or an electric motor. The power end 10 is arranged to drive a plurality of pistons or plungers to produce the desired pressure and flow rate from the fluid end 15. As shown in FIG. 2, the power end data logger 30 includes a power end data port 32 and the fluid end data logger 40 includes a fluid end data logger port 72. Power end data logger 30 communicates with the fluid end data logger 40 via a bus 80 (for example, a serial bus), or other component interconnection (either wired or wireless connections) that couples the power end data port 32 and the fluid end data port 72.

Figure 3A:
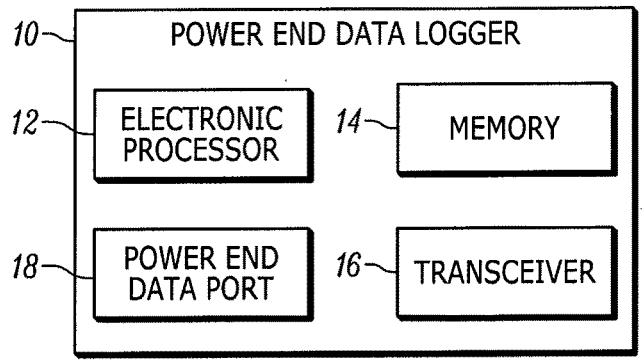
FIG. 3A is a block diagram of a fluid end logger, in accordance with some embodiments.
Figure 3B:
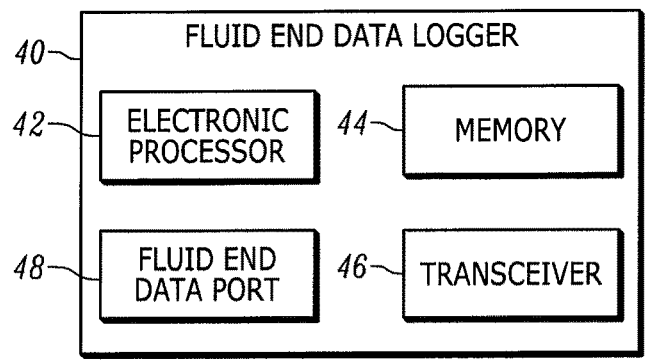
FIG. 3B is a block diagram of a power end logger, in accordance with some embodiments.

FIG. 3A is a block diagram of a power end logger 10, in accordance with some embodiments. The power end logger 10 includes a power end electronic processor 12, a power end memory 14, a power end transceiver 16 and a power end data port 18. FIG. 3B is a block diagram of a fluid end logger 40, in accordance with some embodiments. The fluid end logger 40 includes a fluid end electronic processor 42, a fluid end memory 44, a fluid end transceiver 46 and a fluid end data port 48. In some embodiments, the fluid end memory 44 may include an operating system and one or more software programs that provide algorithms to send, receive and analyze received sensor data. The one or more programs may be configured to implement the methods described herein. The fluid end memory 44 may include volatile memory elements (for example, random access memory (RAM)), nonvolatile memory elements (for example, read only memory (ROM)), and combinations thereof. In some embodiments, the fluid end memory 44 is a removable and hot-swappable non-volatile memory such as an easily changeable secure digital (SD) card. In some embodiments, the power end data port 18 and the fluid end data port 48 are universal serial bus (USB) ports.

Figure 4:
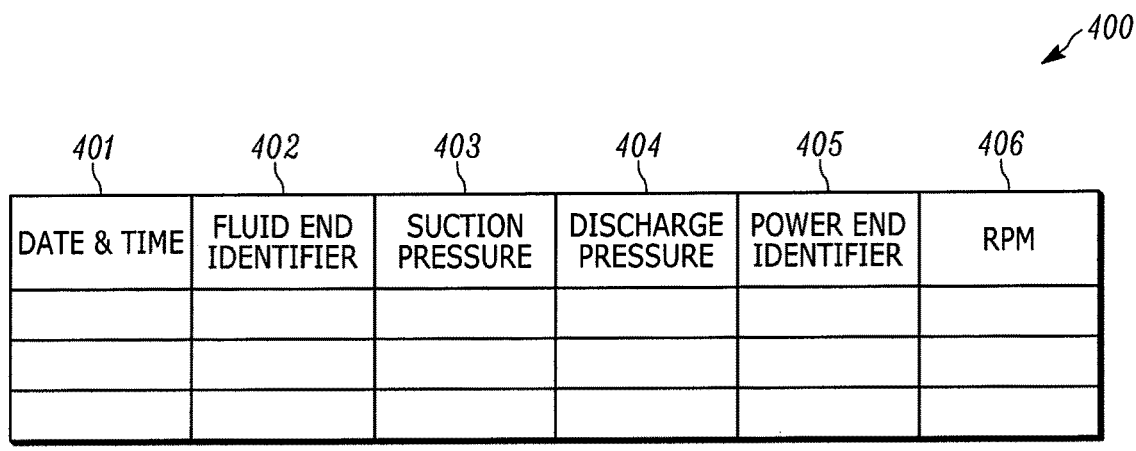
FIG. 4 shows a table for storing various parameters associated with a fluid end, in accordance with some embodiments.

FIG. 4 shows a table 400 used for storing sensor data and other parameters associated with the fluid end 15 in the memory 44 of the fluid end logger 40, in accordance with some embodiments. As shown in FIG. 4, table 400 includes columns 401, 402, 403, 404, 405 and 406. Column 401 lists the various dates and times associated with individual sensor measurements associated with the suction pressure, the discharge pressure at the fluid end 15 and the RPM sensor measurement received from the power end. Column 402 lists the fluid end identifier 16 of the fluid end 15. Column 403 lists suction pressure measurements received from the suction pressure sensor 50. Column 404 lists the discharge pressure measurements received from the discharge pressure sensor 60. Column 405 lists the power end identifier associated with the power end 10 to which the fluid end 15 is coupled. Column 406 lists the RPM measurements received from the RPM sensor 20 associated with the power end 10. In some embodiments, the table 400 is stored in the memory 44 using either a comma-separated values (CSV) file or a Microsoft Excel file.

Figure 5:
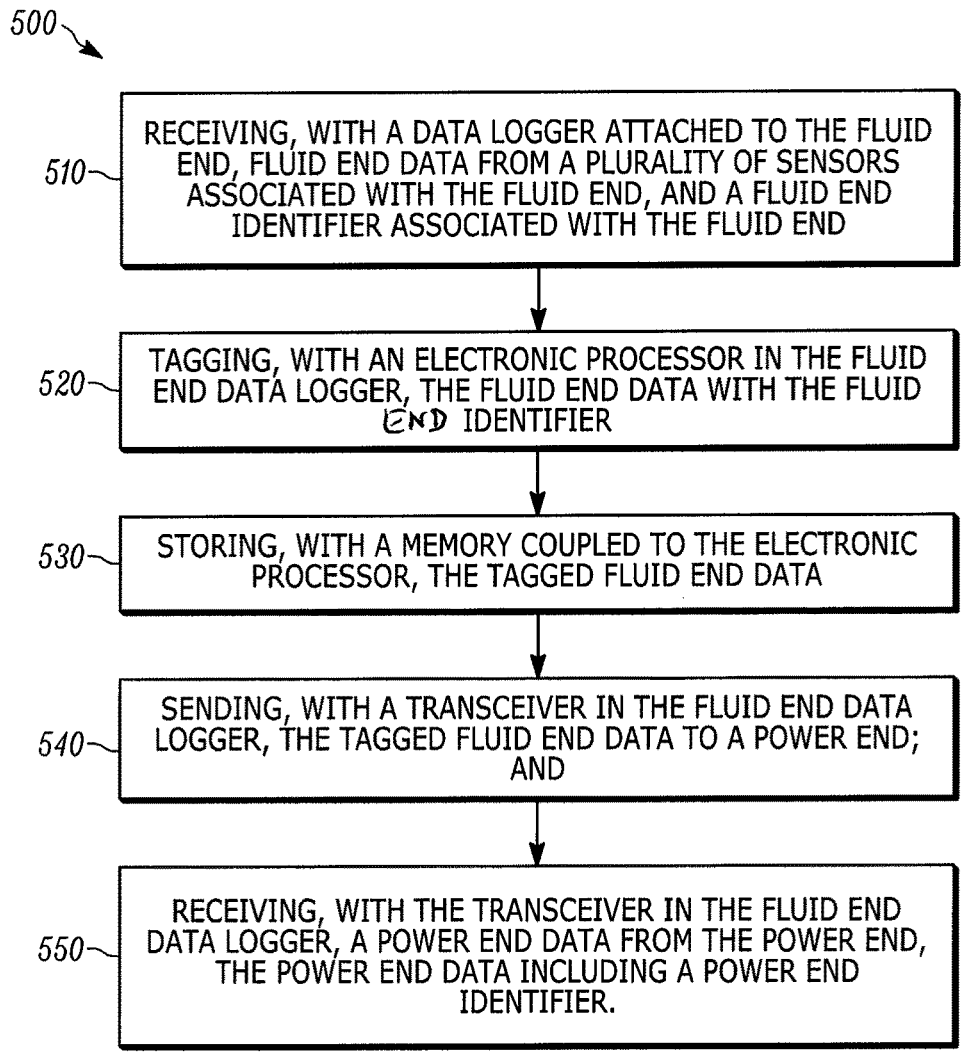
FIG. 5 is a flow chart of a method for monitoring a fluid end, in accordance with some embodiments.

FIG. 5 is a flow chart of a method 500 for monitoring the fluid end 15, in accordance with some embodiments. The method allows for creating a portable, permanent life data associated with the fluid end 15 that can follow with the fluid end 15 as it gets moved from one location to another during the course of its lifetime. This is achieved by writing fluid end life data (for example, sensor data associated with the fluid end 15) into the memory 44 in the fluid end data logger 40.

At block 510, the method 500 includes receiving fluid end data from a various sensors associated with the fluid end (for example, suction pressure sensor 50, discharge pressure sensor 60, etc.) along with the fluid end identifier 16. In some embodiments, at block 510, the method 500 includes receiving fluid end data from discharge pressure sensor. In some embodiments, at block 510, the method 500 includes receiving fluid end data from a suction pressure sensor. At block 520, the method 500 includes tagging, with the electronic processor 42 in the fluid end data logger 40, the fluid end data with the fluid end identifier 16. At block 530, the method 500 includes storing with the memory 44 coupled to the electronic processor 42, the tagged fluid end data generated at block 520. At block 540, the method 500 includes sending, with the transceiver 46 in the fluid end data logger 40, the tagged fluid end data to a power end 10. At block 550, the method 500 includes receiving, with the transceiver 46 in the fluid end data logger, a power end data from the power end 10, wherein the power end data includes a power end identifier. In some embodiments, the method 500 provides tagging additional power end data to fluid end data when the fluid end 15 is disconnected from a first power end and coupled to a second power end (for example, when the fluid end 15 is moved from one location (or site) to another).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Various features and advantages of the invention are set forth in the following claims.

What is claimed is:

1. A fluid end monitoring system, the fluid end monitoring system comprising:
    a fluid end comprising a plurality of sensors; and
    a fluid end data logger coupled to the fluid end, the fluid end data logger including:
        a memory to store a fluid end identifier associated with the fluid end,
        an electronic processor configured to receive fluid end sensor data from the plurality of sensors, tag the fluid end sensor data with the fluid end identifier to generate tagged fluid end sensor data, and store the tagged fluid end sensor data in the memory, and
        a transceiver configured to
            send the tagged fluid end sensor data to a first power end, and
            receive first power end data from the first power end, the first power end data including a first power end identifier.

2. The fluid end monitoring system of claim 1, wherein the plurality of sensors includes a discharge pressure sensor.

3. The fluid end monitoring system of claim 1, wherein the plurality of sensors includes a suction pressure sensor.

4. The fluid end monitoring system of claim 1, wherein the power end includes a power end data logger configured to receive the tagged fluid end sensor data.

5. The fluid end monitoring system of claim 1, wherein the first power end data includes first sensor data received from a first sensor associated with the first power end, and the electronic processor is configured to tag the first power end data with the first power end identifier to generate tagged first power end data, and store the tagged first power end data in the memory.

6. The fluid end monitoring system of claim 5, wherein the first sensor is configured to measure the RPM of an electric motor associated with the first power end.

7. The fluid end monitoring system of claim 1, wherein the electronic processor configured to store the tagged fluid end sensor data in the memory.

8. The fluid end monitoring system of claim 5, wherein the transceiver is configured to receive second power end data from a second power end, the second power end data including a second power end identifier, the second power end data including second sensor data received from a second sensor associated with the second power end, and the electronic processor is configured to tag the second power end data with the second power end identifier to generate tagged second power end data and store the tagged second power end data in the memory.

9. A high pressure pump comprising:
    a power end comprising a plurality of sensors;
    a fluid end operably coupled to the power end;
    a power end data logger coupled to the power end;
    a fluid end data logger coupled to the fluid end; and
    wherein the fluid end data logger includes
        a memory to store a fluid end identifier associated with the fluid end,
        an electronic processor configured to receive first sensor data from the plurality of sensors, tag the first sensor data with the fluid end identifier to generate tagged first sensor data, and store the tagged first sensor data in the memory, and a transceiver configured to send tagged first sensor data to a power end data logger, and receive first power end data from the power end data logger, the first power end data including a first power end identifier.

10. The high pressure pump of claim 9, wherein the plurality of sensors includes a discharge pressure sensor.

11. The high pressure pump of claim 9, wherein the plurality of sensors includes a suction pressure sensor.

12. The high pressure pump of claim 9, wherein the power end includes a power end data logger configured to receive the tagged first sensor data.

13. The high pressure pump of claim 9, wherein the first power end data includes first sensor data received from a first sensor associated with the first power end, and the electronic processor is configured to tag the first power end data with the first power end identifier to generate tagged first power end data, and store the tagged first power end data in the memory.

14. The high pressure pump of claim 13, wherein the first sensor is configured to measure the RPM of an electric motor associated with the first power end.

15. The fluid end monitoring system of claim 13, wherein the transceiver is configured to receive second power end data from a second power end, the second power end data including a second power end identifier, the second power end data including second sensor data received from a second sensor associated with the second power end, and the electronic processor is configured to tag the second power end data with the second power end identifier to generate tagged second power end data and store tagged second power end data in the memory.

16. A method for monitoring a fluid end of a high pressure pump, the method comprising:

receiving, with a fluid end data logger attached to the fluid end, fluid end sensor data from a plurality of sensors associated with the fluid end, and a fluid end identifier associated with the fluid end;

tagging, with an electronic processor in the fluid end data logger, the fluid end sensor data with the fluid end identifier to generate tagged fluid end sensor data;

storing, with a memory coupled to the electronic processor, the tagged fluid end sensor data;

sending, with a transceiver in the fluid end data logger, the tagged fluid end sensor data to a first power end; and receiving, with the transceiver in the fluid end data logger, first power end data from the first power end, the first power end data including a first power end identifier.

17. The method of claim 16, wherein receiving fluid end sensor data includes:

receiving fluid end sensor data from discharge pressure sensor.

18. The method of claim 16, wherein receiving fluid end sensor data includes:

receiving fluid end sensor data from a suction pressure sensor.

19. The method of claim 16, further comprising:

tagging, with the electronic processor, the first power end data with the first power end identifier to generate tagged first power end data, and storing the tagged first power end data in the memory.

20. The method of claim 19, further comprising:

receiving, with the transceiver in the fluid end data logger, second power end data from a second power end when the fluid end is coupled to the second power end, the second power end data including a second power end identifier;

tagging, with the electronic processor, the second power end data with the second power end identifier to generate tagged second power end data, and storing, with the electronic processor, the tagged second power end data in the memory.

* * * * *